Oct. 29, 1946.   L. J. STEVENSON ET AL   2,410,134
METHOD AND APPARATUS FOR FLAME HARDENING
Filed Jan. 16, 1942   6 Sheets-Sheet 5

Inventors
Lawrence J. Stevenson
Lloyd L. Babcock
By Lyon & Lyon
Attorneys

Oct. 29, 1946. L. J. STEVENSON ET AL 2,410,134
METHOD AND APPARATUS FOR FLAME HARDENING
Filed Jan. 16, 1942 6 Sheets-Sheet 6

Inventors
Lawrence J. Stevenson
Lloyd L. Babcock
By Lyon & Lyon
Attorneys

Patented Oct. 29, 1946

2,410,134

UNITED STATES PATENT OFFICE 2,410,134

METHOD AND APPARATUS FOR FLAME HARDENING

Lawrence J. Stevenson, Torrance, and Lloyd L. Babcock, Compton, Calif., assignors to The National Supply Company, Pittsburgh, Pa., a corporation of Pennsylvania Application January 16, 1942, Serial No. 427,012

20 Claims. (Cl. 148—21.55)

This invention relates to a method and apparatus for flame hardening continuous surfaces.

In the flame or surface-hardening of a continuous surface as, for example, the surface of a cylindrical object, it has heretofore been the practice to rotate the cylindrical object while directing flames against the surface from one or more torches and to cool the surface rapidly to produce the desired surface hardness.

Another method, as described in the copending application of Bishop, et al., Serial No. 378,028, filed February 8, 1941, now Patent No. 2,368,087, is to utilize a torch emitting flames around a cylindrical periphery and then to progress the torch axially of the cylinder followed by a quench. In many cases both of these methods are satisfactory, while in other cases they are subject to certain recognized limitations. In most cases where flame-hardening is resorted to, only the "skin" or thin case of a cylindrical surface is flame treated to raise the temperature above the critical temperature and then to quench the surfaces before the heat has penetrated materially into the body of the structure.

If the size of the work, the surface of which is to be flame hardened, is such that the flame cannot cover the entire surface, there must be used either a very large number of torches in order to heat the entire surface rapidly, or a condition results where the flame hardening proceeds around the surface from a starting point and when the flame hardening operation returns to the point of the beginning, the material on the surface at the beginning is reheated, resulting in producing a soft portion on the surface due to the annealing operation of the surface previously flame hardened.

In the second type of apparatus utilizing a single torch positioned so as to simultaneously surround the surface to be flame hardened, the disadvantage is that a separate torch is required for each size of the work the surface of which is to be flame hardened.

It is therefore an object of this invention to provide a flame hardening method and apparatus which overcomes the limitations incident to the use of other methods and apparatus for carrying out flame hardening.

Another object of this invention is to provide a flame hardening method in which there are utilized two flame carrying members which enable the direction of two flames simultaneously against the surface to be heated so that in the flame hardening of a cylindrical surface the flames may be directed against the surface from a starting point and may progress in opposite directions around the surface to meet at another portion of the surface not previously heat treated, thereby avoiding the softening effect of the reheating of a flame hardened surface.

Another object of this invention is to provide an apparatus for the flame hardening of a surface wherein the angle of impingement of the flames emitted from the torch is automatically changed during progressive movement of the torch so as to avoid the possibility of variation in surface hardness of portions of the surface.

Another object of this invention is to provide means for supporting a flame hardening torch which enables the torch to have limited arcuate movement about an axis passing through the zone of the flame contact with the surface.

Another object of this invention is to provide a support for a flame hardening torch providing two oppositely moving torch carriers which are adapted for use on either interior or exterior continuous surfaces.

Other objects and advantages of this invention it is believed will be apparent from the following detailed description of a preferred embodiment thereof as illustrated in the accompanying drawings.

Figures 5 to 10, inclusive, are schematic plan views illustrating the method embodying our invention of surface hardening on an exterior cylindrical surface where the work is maintained stationary.

Figures 11 to 16, inclusive, are similar schematic illustrations of a modified method wherein the work is rotated.

Figures 17 to 20, inclusive, are similar schematic plan views illustrating the operation on the interior surface of a cylindrical object.

Figure 21:
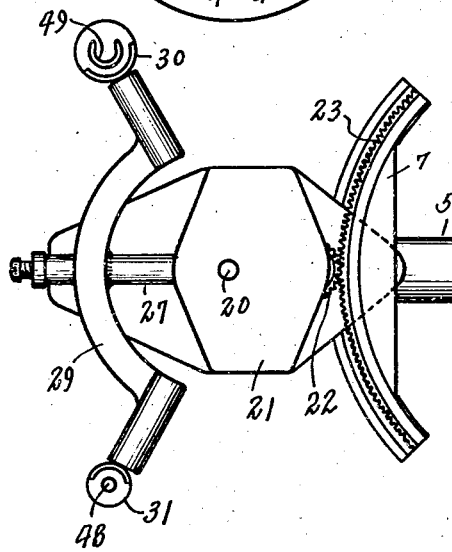

Figure 21 is a diagrammatic plan view illustrating the arrangement of the torch and supporting structure for operating on an inside surface of the character illustrated in Figures 17 to 20, inclusive.

In accordance with our invention, flame torches 1 are positioned so as to apply the flame against a surface 2 which it is desired to flame harden. The torches 1 may be of any suitable or desirable construction and preferably include the means for directing the flame indicated at 3 against the surface and also to direct against the surface a quenching liquid or fluid as indicated at 4 to quench the surface as the torches are moved along the surface 2. These torches may be of any suitable or desirable construction.

The torches 1 are preferably supported upon rods 5 held within brackets 6.

Our invention contemplates the utilization of duplicate supporting devices, and it is believed that it will therefore be only essential to describe one of the supporting devices as such description will suffice for both.

The bracket 6 is fastened to a movable gear segment 7. The movable gear segment 7 is mounted upon a base structure 8. The base structure 8 is secured to an extension bar 9 which is slidably mounted in a slideway formed in the tiltable mount 10. The tiltable mount 10 is secured to a trunnion 11 which is journaled in the bracket 12. The bracket 12 has affixed therein a supporting column 13. In this manner the torches 1 are supported so as to have universal movement and so that they may be translated to or from the work to be flame-hardened.

Figure 3:
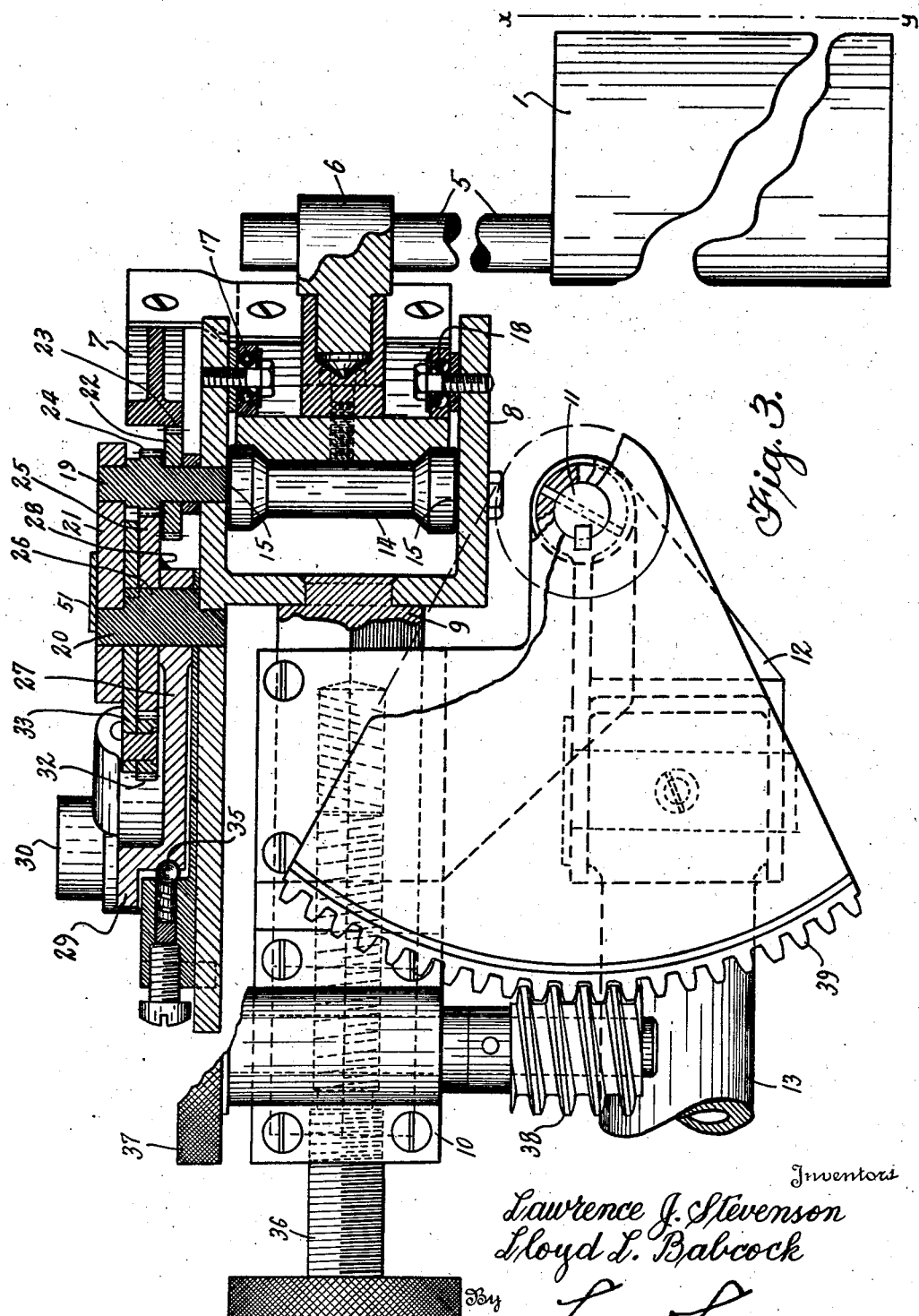
Figure 3 is a vertical section side elevation on line 3—3 of the structure as illustrated in Figure 2.

The rotation of the torch 1 in a horizontal direction and at right angles to the plane of the paper as viewed in Figure 3 is such as to effect rotation around a center line XY which is the line of flame contact with the work to be flame hardened and is a distance spaced in front of the torch 1. In order to effect this rotation and to control the direction of rotation, the following means are provided:

The bracket 6 is mounted on the movable gear segment 7. A pair of bearing rollers 14 are rotatably mounted upon spindles 15 and 16 fixed upon the base structure 8 and cooperate with the upper and lower bearings 17 and 18 to rotatably support the gear segment 7. As thus mounted on the rollers 14 and bearings 17 and 18 the gear segment 7 is adapted to have limited arcuate movement about the axis XY.

A pair of shafts 19 and 20 are mounted between the base member 8 and a cover member 21. Fixed upon the shaft 19 is a spur gear 22 which is adapted to mesh with the spur gear segment 23 carried upon the gear segment 7. Also fixed upon the shaft 19 is a second spur gear 24 which is adapted to mesh with a master gear 25 mounted upon the eccentric portion 26 of the shaft 20.

Figure 1:
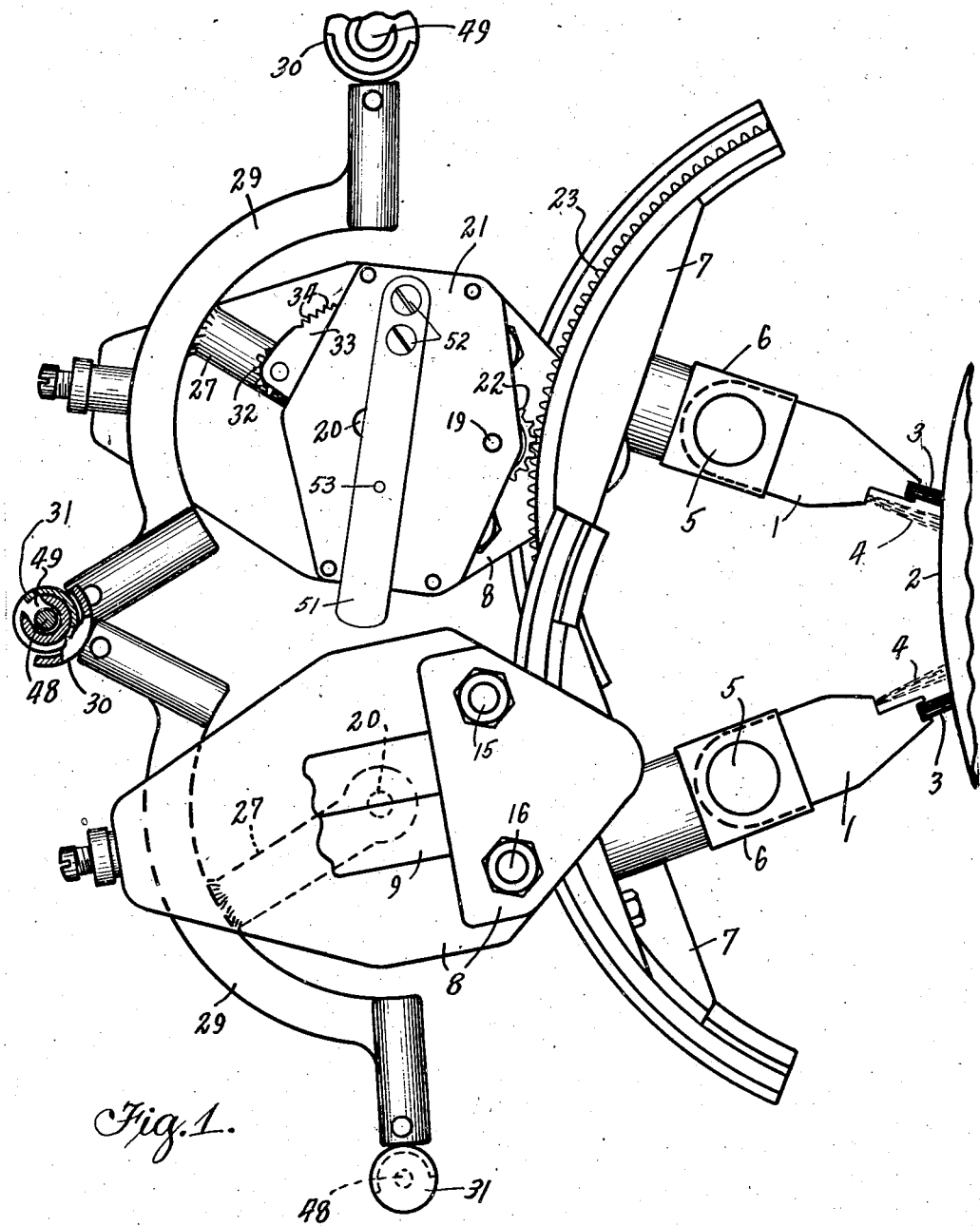
Figure 1 is a top plan view diagrammatic in character of the apparatus and illustrating the method embodying our invention.
Figure 2:
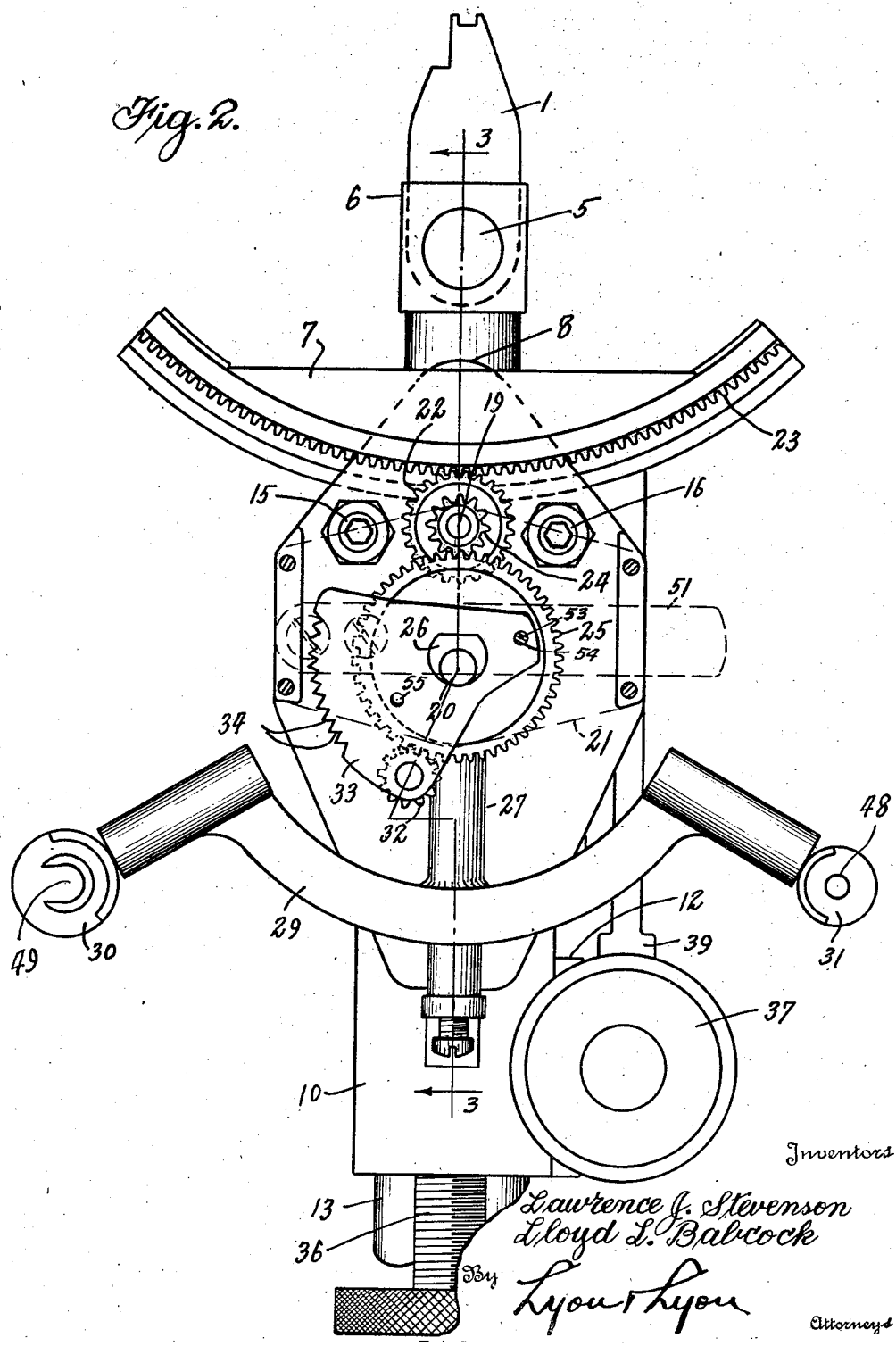
Figure 2 is a top plan view of one of the torch supporting members embodied in our invention with a cover plate removed and illustrated in dotted lines together with a latch bar in dotted lines.

A radially extending arm 27 is rotatably mounted upon said eccentric portion of the shaft 20 and fixed relative to the master gear as, for example, by the welding indicated at 28. This arm carries at its outer end an arcuate bracket 29 provided with a pair of contact pieces 30 and 31. When the bracket 29 is shifted clockwise as viewed in Figure 2, the master gear 25 is rotated to turn the gears 24 and 22 counter-clockwise and hence the movable gear segment 7 to turn clockwise about the axis XY. In this arrangement rotation of the bracket 29 and movable gear segment 7 are in the same direction.

In order to effect opposite rotation of the movable gear segment 7 with relation to the bracket 29, as is sometimes necessary, as is hereinafter set forth, there is provided an idler gear 32 which is carried by the plate 33 mounted upon the shaft 20. When the plate 33 and shaft 20 are turned relative to the base member 8, the master gear 25 is moved laterally out of mesh with the gear 24 due to the eccentric mounting of the shaft 20. During this rotation the idler gear 32, which is maintained in constant mesh with the master gear 25, is moved into mesh with the gear 24. By interposing the idler gear 32 in the gear train between the master gear 25 and gear 24, the relative directions of rotation of the bracket 29 and segment 7 are reversed. The latch bar 51 may be provided if desired for latching the plate 33 in selected position. As shown in the drawings, the latch bar 51 comprises a resilient strip of metal secured to the cover 21 by screws 52 and carrying a pin 53. The pin 53 extends through a hole (not shown) in the cover 21 and is received in either the recess 54 or the recess 55 formed in the plate 33. When the plate 33 is to be shifted, the free end of the latch bar 51 is manually raised to disengage the pin 53 from one of the recesses 54, 55. The plate 33 is then rotated until the pin 52 enters the other recess under pressure from the resilient latch bar 51. In order to provide for rotation of the plate 33 there is provided a series of notches 34 to permit the plate to be more readily grasped.

Means are provided for maintaining the parts in central position, i. e., corresponding to a radial position of the torch 1 with respect to the cylindrical surface to be flame-hardened, which means as herein illustrated consists of a ball detent device 35. Means are provided for controlling the sliding movement of the bar 9 within the mount 10 so as to enable accurate adjustment of the torch 1 a distance away from the surface of the flame to be hardened, which, as herein illustrated, includes an adjustment screw 36 which is threaded in the adjustable mount and is also threaded axially of the member 9, the pitch of the two threads being different in order to permit accuracy of control on the turning of the screw 36. Means are also provided for controlling the tilt of the torch 1 in order to permit the same to be aligned with the surface to be flame-hardened, which means as herein illustrated includes a leveling screw 37 which is journaled in the tiltable mount 10 and carries a worm 38 adapted to mesh with the worm segment 39. The worm segment 39 is secured to the trunnion 11.

Figure 4:
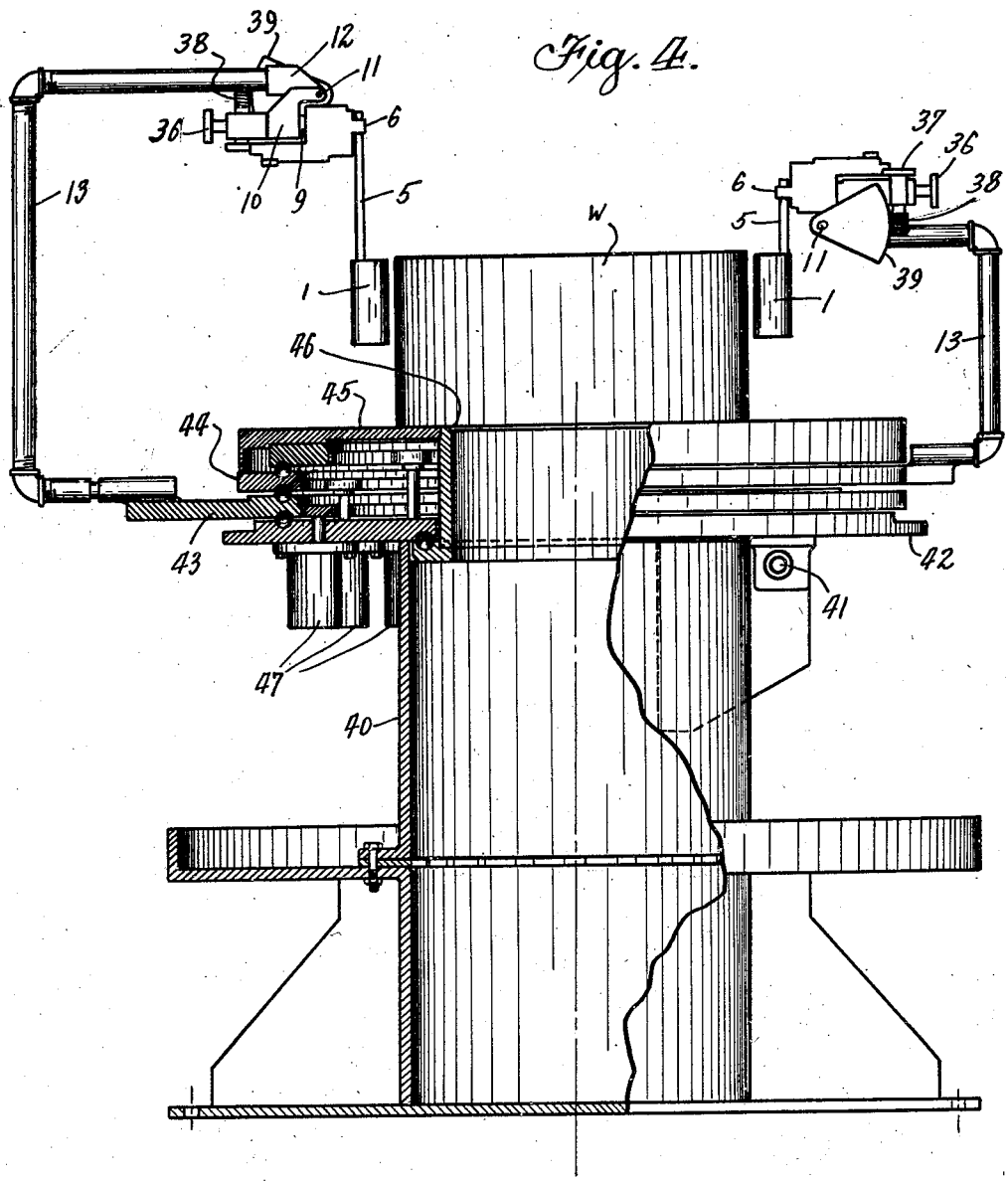
Figure 4 is a side elevation partly in vertical section illustrating the adaptation of our invention and the method and apparatus embodying our invention in the heat treating of the exterior surface of a cylindrical object.
Figure 5:
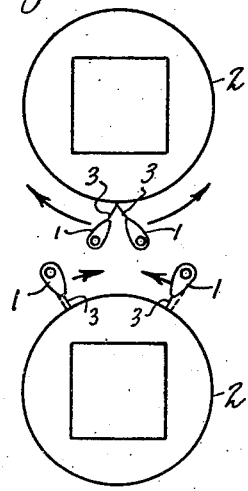

Means are provided for supporting the flame-hardening means which may be of any suitable form as, for example, illustrated in Figure 4. The supporting means includes a stationary frame 40 which is pivotally connected as indicated at 41 to a base plate 42. The base plate 42 normally rests upon the frame structure 40 but may be tilted about the pivot 41 in the event it is desired to rotate the torches or workpiece 2 about an axis other than vertical.

Rotatably mounted upon the base plate 42 are two independent rings 43 and 44 and an annular table 45 provided with a central opening 46. The workpiece W is supported upon the table 45 with the axis of the workpiece W coincident with the rotary axis of the table 45.

The torch mechanism supporting columns 13 are mounted upon the intermediate rings 43 and 44 respectively. The rings 43 and 44 and the table 45 may be independently rotated by any convenient means. As indicated in Figure 4, independent motors 47 are provided for driving these rings through suitable gearings. These motors may be either hydraulic or electric, requirement being that a precise control of the relative rotating speeds of the members 43, 44 and 45 be maintained.

Figure 6:
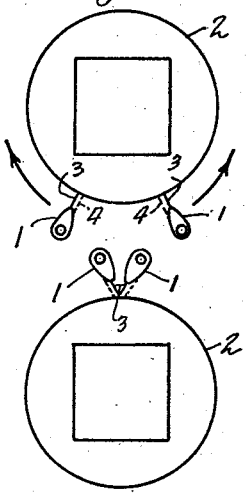
Figure 7:
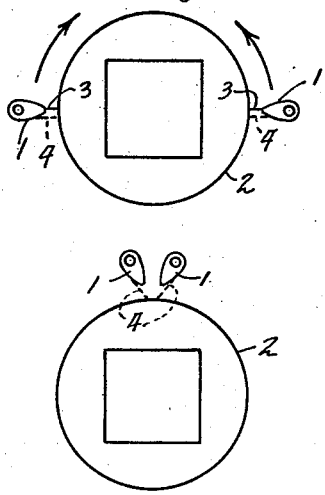
Figure 8:
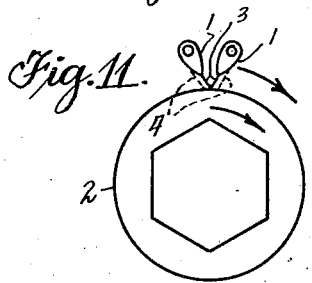
Figure 9:
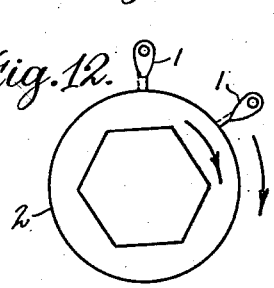

Operation of our apparatus for flame hardening is: The two torches 1 are progressed in opposite directions around the surface 2 to be hardened, each torch passing through one-half revolution with respect to said cylindrical surface. Referring to Figures 5 to 10, inclusive, the torches are initially directed so that their heating flames 3 meet along a common line upon the surface of the workpiece W. Movement of the torches in opposite directions is then commenced and streams of quenching fluid 4 are immediately directed from the torches to the surface heated by the flames. As the torch is moved relative to the surface 2, the angle of impingement of the flames is automatically changed until the direction is substantially normal to the surface 2 as indicated in Figures 6, 7 and 8.

Figure 10:
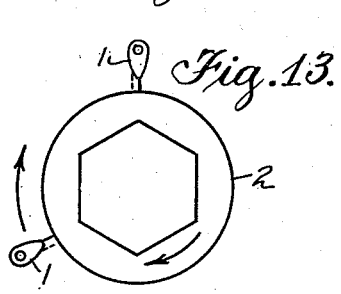
Figure 11:
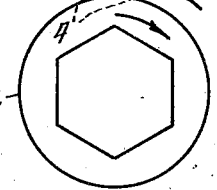
Figure 12:
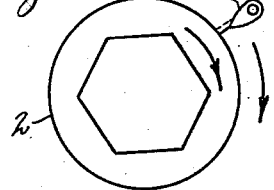
Figure 13:
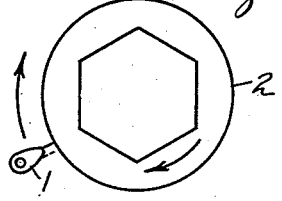
Figure 14:
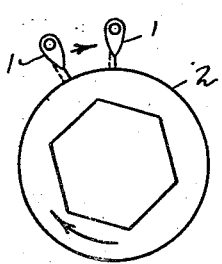
Figure 15:
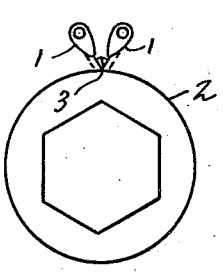
Figure 16:
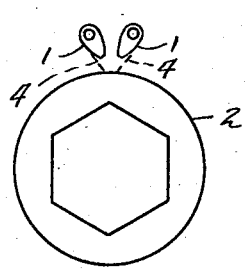
Figure 17:
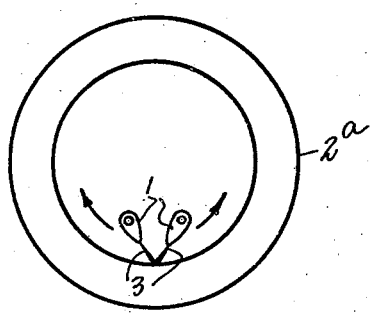
Figure 18:
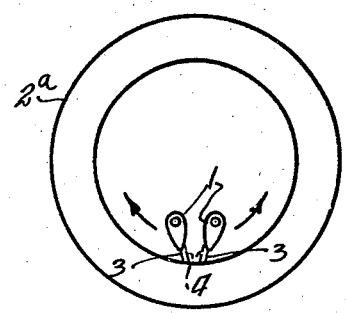
Figure 19:
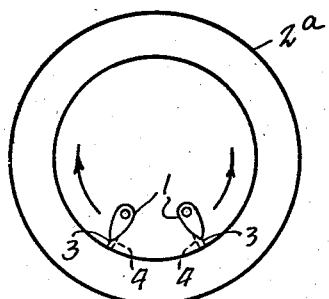
Figure 20:
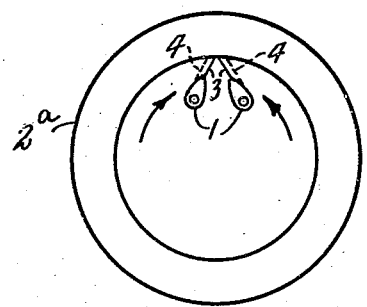

When the torches approach each other on the side of the workpiece opposite from the starting point, the angle of impingement of the flames is again automatically changed so that the flames may finally meet on a second line upon the surface of the workpiece W. When the final position is reached (Figure 9), the flames 3 are immediately extinguished and relative movement of the torches is stopped but the quenching streams 4 are not shut off until the final heated portion has been quenched (Figure 10). The angle of the quenching streams at the final position (Figure 10) is such that in the absence of heating flames the last line of heating receives an adequate quench, that is, as the flames converge toward each other, so do the quenching streams.

It will be apparent from the foregoing that as the cylindrical surface is uniformly heated around its entire periphery that no soft spots remain at the initial or final positions since at both of these points the metal is first heated and then quenched as at substantially any other point upon the surface. At no point upon the surface is the previously flame hardened portion of the surface subjected to a second heating which would cause a soft spot due to the annealing effect.

As an illustration of this distinction, consider the effect of hardening a cylindrical surface by traversing a single torch completely around its periphery and progressively quenching the heated surface. In such a case the torch would reheat that portion of the surface previously hardened at the commencing of the operation, and this reheating effect would result in a variation of hardness at the initial or starting point due to the annealing effect of reheating.

The method as illustrated diagrammatically in Figures 5 to 10, inclusive, may be carried out with the apparatus as illustrated in Figures 1 to 4, inclusive. The torches 1 are mounted independently upon separate base members with one of the base members in inverted position. The contact pieces 30 and 31 interengage and thereby control the angular position of the arcuate brackets 29. In the initial position, the flames 3 are superimposed on a common line and the quench streams 4 remain shut off. The motors 47 are then started to revolve the movable gear segments 7 in opposite directions and the quench streams are directed against the work. As the movable gear segments 7 separate, the coaction between the contact pieces 31 causes turning motion of the arcuate brackets 29 and this in turn causes pivotal movement of the torches 1. This pivotal movement of each torch occurs about the zone of contact of the flame and hence the traversing speed of the flame along the workpiece is unaffected by the pivotal movement of the torch.

The change in the angle of impingement of the flames against the work is therefore accomplished automatically incident to the separation of the base members 7 and 7 of the separate torch-carrying members. It is apparent that the change in angle of impingement is from a lagging direction toward a direction radial to the work surface 2.

When the base members 7 of the two torches separate sufficiently so that the torches 1 assume a radial position, the pin 48 of the contact piece 31 moves out of the slot 49 of the contact piece 30, thereby separating the contact pieces 30 and 31 and terminating pivotal movement of the torches. The two torches 1 then travel at uniform speed in opposite directions around the workpiece. When the two torches approach each other, the pin 48 of the other contact piece 31 enters the slot 49 on the other contact piece 30, thereby initiating further coaction of the arcuate brackets 29 to change the angle of the flame impingement by progressively rotating the torches 1 toward each other. This change in angle of flame impingement is from a radial direction to a leading direction. When the flames 3 meet on a common line, the operator extinguishes the flames and stops relative movement by stopping the motors 47. The quench streams 4 are allowed to continue for a few seconds in order to quench the last-heated portion of the surface of the workpiece W.

It will be apparent from the foregoing that the process as illustrated in Figures 5 to 10, inclusive, that the work remains stationary and therefore the torches reach a final position on the opposite side of the work from the starting point. If the workpiece is large, the operator may have difficulty in observing the approach of the torches on the far side without leaving his position near the controls. In order to overcome this difficulty, the workpiece may be rotated while one torch remains stationary and the other revolves at twice the speed of the work. This latter method of operation is illustrated in Figures 11 to 16, inclusive, and has the same effect upon the workpiece as the method illustrated in Figures 5 to 10, inclusive, as the relative speeds of the torches and work are the same. This second described method, however, permits the initial and final positions of the flame hardening to occur in the same location relative to the operator's location. Thus the starting point on the work surface travels one-half revolution while one torch moves through a complete revolution and the other torch remains substantially stationary.

In the operation of hardening an inside surface of a workpiece 2ª, an extension piece 50 is inserted between the member 7 and the torch 1 (Figure 21). The piece 50 is of such length that when the torch 1 is directed against the inside surface of the workpiece 2ª, that the pivotal axis of the member 7 is coincident with the zone of flame contact on the inner surface of the member 2ª. The gear train is changed so as to insert the idler gear 32 between the master gear 25 and the gear 24 so that the arcuate bracket 29 and movable segments 7 of the two torches I rotate in opposite directions. The reason for this change will be understood when it is noted that the torches are in position to operate on the inside surface and are therefore disposed on opposite sides of the pivotal axis of the arcuate member 7. Therefore, the relative movement of the arcuate member 7 and the arcuate bracket 29 must be opposite to that required when hardening an outside surface.

The sequence of movement of the torches I when hardening an inside surface is illustrated in Figures 17 to 20, inclusive. It is obvious that the method of rotating the work as illustrated in Figures 11 to 16 could also be employed in connection with the hardening of an inside surface. It is understood that the details of construction of the torches and the means for delivering the combustible gas and quenching fluid to them may be of any suitable form, the particular construction not forming any part of this invention.

Having fully described our invention, it is to be understood that we do not wish to be limited to the details herein set forth, but our invention is of the full scope of the appended claims.

We claim:

1. The method of flame hardening a continuous surface, comprising the steps of directing two separate heating flames against a common position on said surface, traversing the flames simultaneously in opposite directions with respect to said surface, directing streams of quenching fluid against the surface immediately following application of the flames, changing the angle of impingement of the flames during the traversing movement from a lagging direction to a leading direction, extinguishing both flames upon their meeting at a common location on the surface remote from the starting position, and continuing the application of quenching fluid until the entire heated portion has been quenched.

2. The method of flame treating a continuous surface, comprising the steps of directing two separate heating flames against a common initial position on said surface, traversing the flames simultaneously in opposite directions with respect to said surface, changing the angle of impingement of the flames during the traversing movement from a lagging direction to a leading direction, and extinguishing both flames upon their meeting at a common final location on the surface remote from the starting position.

3. The method of flame hardening a continuous metallic surface, comprising the steps of directing two separate heating flames against a single line element of the surface, traversing the flames simultaneously in opposite directions with respect to said surface, directing streams of quenching fluid against the surface immediately following application of the flames, extinguishing both flames upon their meeting at a common line element of the surface at a point remote from the starting point, and continuing the application of quenchinng fluid until the entire heated surface has been quenched.

4. The method of heat treating a continuous surface, comprising the steps of directing two separate heating devices against a single line element of the surface, traversing the heating devices simultaneously in opposite directions with respect to said surface, directing streams of quenching fluid against the surface immediately following the heating devices, rendering the heating devices ineffective upon meeting at a common line element of the surface at a point remote from the starting point, and continuing the application of quenching fluid until the entire heated surface has been quenched.

5. The method of flame treating a cylindrical surface of a work piece, comprising the steps of directing two separate heating flames against a common initial position on said surface, revolving the work piece at a certain angular speed about the axis of the cylindrical surface, revolving one of the heating flames about the same axis in the same direction at a greater angular speed while maintaining the other heating flame substantially stationary, and extinguishing both flames upon their meeting at a common final location on the surface remote from the initial position.

6. In a device for hardening a closed endless metallic surface, the combination of a pair of heater elements each adapted to be positioned adjacent a starting position on said surface, means for traversing the heater elements simultaneously in opposite directions with respect to said surface to meet at a final common position, and quench means associated with each heater element adapted to direct a coolant against the surface immediately following application of heat by its respective heater element.

7. In a device for flame hardening a circular surface, the combination of a pair of torches each adapted to direct flame against a common element of said surface, means for progressing said torches simultaneously in opposite directions from said common element through one-half revolution with respect to said circular surface, and quench means associated with each torch each adapted to direct a coolant against the surface heated by its respective torch.

8. In a flame treating device, the combination of a pair of torches adapted to direct separate heating flames against a closed continuous surface, each torch being supported on a carrier member mounted for limited arcuate movement about an axis intersecting the zone of contact of the flame and said continuous surface, each carrier member being operatively supported upon a relatively stationary base member, means for traversing said base members in opposite directions with respect to said continuous surface whereby the heating flames, diverge from a common starting position, means including a control element pivotally mounted on each base member adapted to control arcuate movement of its respective carrier member, and interengaging means associated with the control elements adapted to turn the carrier members and thereby change the angle of impingement of the flames incident to relative traversing movement of the base members, said interengaging means being operable to direct said separate heating flames against a single common final position on said continuous surface.

9. In a flame treating device, the combination of a pair of torches adapted to direct separate heating flames against a common line element of a cylindrical surface, each torch being supported on a carrier member mounted for limited arcuate movement about an axis substantially coincident with the line contact of the flame and said surface, each carrier member being operatively supported on a base member, means for revolving the base members about the axis of the cylindrical surface in opposite directions with respect to said common line element of said surface, means including a control element pivotally mounted on each base member adapted to control arcuate movement of its respective carrier member, and interengaging means associated with the control elements adapted to turn the carrier members and thereby change the angle of impingement of the flames from a lagging direction to a leading direction, said interengaging means being automatically actuated incident to the relative movement of the base members, and adapted to direct the separate heating flame against a common line element of said surface incident to movement of the carrier members to final position.

10. In a device for flame hardening a closed continuous surface, torch supporting apparatus having in combination a pair of base members, a carrier member mounted on each base member for limited arcuate movement relative thereto, a torch mounted on each carrier member adapted to direct flame against said closed surface, means for moving said base members in opposite directions around said closed surface whereby the torch flames may separate from a common starting position and meet at a common final position, means for turning each carrier member relative to its base member including a gear segment on each carrier member, a control element pivotally mounted on each base member, gear means operatively connecting each control element in driving relation with its respective gear segment, the gear means each being provided with a selectively operable reversing device whereby turning movement of the control element in one direction may be utilized for turning the carrier member in either direction as desired.

11. The method of hardening an endless path on the surface of an object formed of a quench-hardenable material, which consists in applying a pair of heat sources in side-by-side relation to a medial part of the path to be treated and then relatively moving said sources away from one another along said endless path at such rates as to raise the temperature of surface layers in said path to hardening temperature, then while said movement of said heat sources is taking place and when the same have separated a predetermined distance impinging quenching fluid from a pair of separable quenching fluid sources upon the initially heated portion of said path to quench the same, dividing said quenching fluid sources while continuing the supply of fluid therethrough by causing the same to move relatively away from one another, one each to follow one of said heat sources at a predetermined spacing behind the same, continuing said movements until all portions of said endless path have been raised to hardening temperature, and then discontinuing the application of heat and continuing the application of said quenching fluid until all heated portions have been quenched.

12. The method of hardening an endless path on the surface of an object formed of a quench-hardenable material, which consists in applying a pair of heat sources in side by side relation to an initial zone on said path and then relatively moving said sources away from one another along said path at such rates as to raise the temperature of a surface layer in said path to hardening temperature, then while said movement of said heat sources is taking place and, when the same have moved a predetermined distance, impinging quenching fluid from separate relative movable quenching fluid sources upon each of the initially heated portions of said path to quench the same, continuing the relative movement of said heat sources, followed at a predetermined distance by said moving quenching fluid sources until said heat sources create a unitary terminal zone, at hardening temperature, discontinuing the application of heat and continuing the application of said quenching fluid until they simultaneouly act to quench said terminal heated zone.

13. The method of hardening an uninterrupted peripheral path around the surface of a round object formed of a quench-hardenable material, which consists in applying a pair of heat sources in side-by-side relation to a part of the peripheral path to be treated and then relatively moving said sources away from one another along said peripheral path at such rates as to raise the temperature of surface layers in said path to hardening temperature, then while said movement of said heat sources is taking place and when the same have separated a predetermined distance impinging quenching fluid from a pair of separable quenching fluid sources upon the initially heated portion of said path to quench the same, then continuing the supply of fluid through said quenching fluid sources and dividing the same by causing them to move away from one another, one each to follow one of said heat sources at a predetermined spacing behind the same, continuing said movements of said heat and quenching fluid sources until said heat sources join again in side-by-side relation to form a unitary terminal zone of hardening temperature, discontinuing the application of heat at the thermal zone and continuing the application of the quenching fluid thereto until said thermal zone is quenched.

14. The method of flame-hardening an uninterrupted peripheral path around the surface of a quench-hardenable body which consists in controllably applying a pair of separable high temperature flames to an initial merged zone of heating on the surface of said body until said zone is raised to hardening temperature, then translating said flames away from one another at a controlled rate to raise extending surface paths on said body to hardening temperature, then applying to said initial merged zone a pair of separable supplies of quenching fluid to quench and harden said initial zone, continuing the relative movement of said flames at regulated rates over the surface of said body along paths which ultimately meet at a final merged zone on the surface of said body and simultaneously therewith separating said quenching fluid sources and translating the same away from one another at the respective rates and along the respective paths of said respective flames and at a predetermined spacing thereafter, continuing the movement of said heating flames and quenching supplies until said flames again merge, forming a final merged zone of heating, then removing said flames from said body, and finally continuing the application of said quenching fluid supplies until they simultaneously act to quench said final zone of heating.

15. The method of flame-hardening an uninterrupted peripheral path on the surface of a quench-hardenable body which consists in applying a pair of combined quench and flame supply jets in a position inclining toward one another at their jet ends to a part of said path, igniting said flames so as to form a single initial heated zone on said path, tilting said jet ends of said jets away from one another to extend said heated zone and to bring the quench supply portions of said jets to bear upon the medial portions of said heated zone, initiating a supply of quenching fluid through said jets, continuing the tilting of said jets until they become substantially normal to said path, then relatively moving said jets away from one another while maintaining them in positions substantially normal to said path and while preserving a substantially constant distance of the same from said path, continuing said movement while maintaining said flames and quench supplies until said jets meet to form a single terminal heated zone, extinguishing said flames, and continuing the supply of quenching fluid through said jets.

16. In an apparatus for flame-hardening a continuous peripheral path on the surface of a cylindrical object, the combination comprising means for mounting an object to be treated, a right-hand and a left-hand rotatable arm mounted for relative rotation about an axis concentric with said object, said arms being adapted to be moved to angular positions in close proximity to one another at diametrically opposed starting and stopping locations on opposite sides of said object, means for simultaneously rotating said arms relatively at predetermined rates and in opposite senses of rotation from said starting location to said stopping location, a right-hand torch and a left-hand torch having combined flame and quenching fluid jets tiltably mounted respectively on said movable arms, said tiltable jets being so arranged that the quenching fluid jet portions thereof are adjacent when said arms are in starting position, means adapted to permit said torches, when in said starting position, to be tilted so that the quenching fluid jet portions thereof are withdrawn and the flame jet portions thereof are advanced to cause the same to converge and to direct the flames therefrom against points in close proximity to one another on said object, means for separately tilting said jets apart to a normal operating position with respect to said arms, means for establishing a supply of quenching fluid to said quenching fluid jet portions, means for initiating relative movement of said movable arms, means for tilting said jets toward one another at their jet ends as they approach the stopping location.

17. In an apparatus for flame-hardening a continuous peripheral path on the surface of a cylindrical object, the combination comprising means for mounting an object to be treated, a pair of torch supports relatively movable from and to one another around the periphery of said object from a starting location to a stopping location, torches mounted upon said supports positioned to direct their flames against the periphery of said object, means for moving said torches from the starting location to the stopping location and means for sequentially applying quenching fluid to the portions of said object which have been heated by said flames.

18. In an apparatus for flame-hardening a path on the surface of an object, the combination comprising means for applying flames in close proximity to one another at a point on said path, means for causing said flames to separate and move relative to one another away from one another along said path, means for sequentially impinging quenching fluid streams first against the point of initial heating of said path, and means for causing said streams to separate and follow said moving flames at a rate consonant with the rate of said flames and at a predetermined distance behind the same.

19. In an apparatus for flame-hardening a continuous peripheral path on a cylindrical object, the combination comprising means for applying a pair of flames in close proximity to one another at an initial point on said path, means for causing said flames to separate and move relative to one another away from one another along said path to a terminal area of close proximity to one another, means for sequentially impinging a pair of quenching fluid streams first against said point of initial heating of said path, and means for causing said streams to separate and follow said moving flames at a rate consonant with the rate of said flames and at a predetermined distance behind the same.

20. In an apparatus for flame-hardening a peripheral path on the surface of a cylindrical object, the combination comprising a pair of torches adapted to emit heating flames and streams of quenching fluid, movable mounting means for said torches adapted to transport the same in opposite directions around the surface of an object to be treated, pivotal means between said torches and said mounting means to permit said torches to be tilted with respect to said mounting means, means for tilting said torches away from one another at the outset of their movement, and means for tilting said torches toward one another at the conclusion of their movement.

LAWRENCE J. STEVENSON.
LLOYD L. BABCOCK.